US 8,095,935 B2
Jan. 10, 2012

(12) United States Patent
Paramasivam et al.

(54) ADAPTING MESSAGE DELIVERY ASSIGNMENTS WITH HASHING AND MAPPING TECHNIQUES

(75) Inventors: Kartik Paramasivam, Redmond, WA (US); Pan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 12/147,155

(22) Filed: Jun. 26, 2008

(65) Prior Publication Data
US 2009/0328054 A1 Dec. 31, 2009

(51) Int. Cl.
G06F 9/46 (2006.01)
(52) U.S. Cl. .................................................. 718/105
(58) Field of Classification Search .................. None
See application file for complete search history.

(56) References Cited

U.S. PATENT DOCUMENTS

| | | | |
|---|---|---|---|
| 6,424,992 B2 | 7/2002 | Devarakonda et al. | |
| 6,587,866 B1* | 7/2003 | Modi et al. | 718/105 |
| 6,748,437 B1* | 6/2004 | Mankude et al. | 709/227 |
| 7,003,574 B1 | 2/2006 | Bahl | |
| 7,088,718 B1* | 8/2006 | Srivastava | 370/392 |
| 7,346,686 B2 | 3/2008 | Albert et al. | |
| 7,353,276 B2 | 4/2008 | Bain et al. | |
| 7,606,916 B1* | 10/2009 | Potter et al. | 709/229 |
| 7,877,511 B1* | 1/2011 | Berger et al. | 709/242 |
| 2002/0143953 A1 | 10/2002 | Aiken, Jr. | |
| 2003/0023744 A1* | 1/2003 | Sadot et al. | 709/234 |
| 2003/0088672 A1* | 5/2003 | Togasaki | 709/226 |
| 2003/0172164 A1* | 9/2003 | Coughlin | 709/227 |
| 2003/0225859 A1* | 12/2003 | Radia et al. | 709/219 |
| 2004/0205250 A1* | 10/2004 | Bain et al. | 709/249 |
| 2004/0260745 A1 | 12/2004 | Gage et al. | |
| 2004/0268357 A1 | 12/2004 | Joy et al. | |
| 2005/0038905 A1 | 2/2005 | Banes et al. | |
| 2006/0036747 A1* | 2/2006 | Galvin et al. | 709/228 |
| 2006/0155862 A1* | 7/2006 | Kathi et al. | 709/229 |
| 2006/0165003 A1* | 7/2006 | Partridge | 370/248 |
| 2006/0248194 A1* | 11/2006 | Ly et al. | 709/226 |

(Continued)

OTHER PUBLICATIONS

"A Proposal of DNS-Based Adaptive Load Balancing Method for Mirror Server Systems and Its Implementation," by Hiroshi Yokota, Shigetomo Kimura and Yoshihiko Ebihara, University of Tsukuba, IEEE 2004, 18th International Conference on Advanced Information Networking and Application, 6 pgs. [online] [retrieved on Apr. 11, 2008]. Retrieved from the Internet: http://ieeexplore.ieee.org/Xplore/login.jsp?url=/iel5/9028/28653/01283788.pdf?arnumber=1283788.

(Continued)

*Primary Examiner* — Idriss N Alrobaye
(74) *Attorney, Agent, or Firm* — Workman Nydegger

(57) ABSTRACT

A system for efficiently distributing messages to a server farm uses a hashing function and a map-based function, or combinations thereof, to distribute messages associated with a processing request. In one implementation, for example, the hashing function has inputs of an identifier for each message in a processing request, and a list of available servers. Upon identifying that any of the servers is unavailable, or will soon be unavailable, the load balancing server uses an alternate map-based assignment function for new requests, and inputs each assignment into a server map. The load balancing server can then use the map or the hashing function, as appropriate, to direct messages to an operating server. Upon receiving an updated list of available servers, the load balancing server can switch back to the hashing function after the map is depleted, and use the updated server list as an argument.

8 Claims, 4 Drawing Sheets

U.S. PATENT DOCUMENTS

| | | | |
|---|---|---|---|
| 2007/0005801 A1 | 1/2007 | Kumar et al. | |
| 2007/0209040 A1* | 9/2007 | Alstad | 719/315 |
| 2008/0025230 A1 | 1/2008 | Patel et al. | |
| 2008/0195754 A1* | 8/2008 | Cuomo et al. | 709/238 |
| 2008/0228926 A1* | 9/2008 | Shiratzky et al. | 709/228 |
| 2008/0275943 A1* | 11/2008 | Grayson et al. | 709/203 |
| 2009/0265467 A1* | 10/2009 | Peles | 709/226 |
| 2009/0271798 A1* | 10/2009 | Iyengar et al. | 718/105 |

OTHER PUBLICATIONS

"How Network Load Balancing Technology Works," by Author Unknown, Microsoft Corporation, Mar. 28, 2003, 19 pgs. [online] [retrieved on Apr. 11, 2008]. Retrieved from the Internet: http://technet2.microsoft.com/WindowsServer/en/library/1611cae3-5865-4897-a186-7e6ebd8855cb1033.mspx?mfr=true.

* cited by examiner

ADAPTING MESSAGE DELIVERY ASSIGNMENTS WITH HASHING AND MAPPING TECHNIQUES

CROSS-REFERENCE TO RELATED APPLICATIONS

N/A

BACKGROUND

Background and Relevant Art

Conventional computer systems are now commonly used for a wide range of objectives, whether for productivity, entertainment, or the like. One reason for this is that, not only do computer systems tend to add efficiency with task automation, but users can often coordinate computer systems with other computer systems for further efficiency. For example, a client computer system that needs to execute a calculator program could be configured to open and execute the program through a separate server computer system over a network communication. The server system could then send responses for various number calculation requests back over the network to the requesting computer, which then presents the results to the user in a user interface. Since another computer (the server system) is executing the calculator program, the client computer system can reserve processing resources for other more important tasks.

As is increasingly the case, computer processing and communication capabilities over a network continue to improve, and scenarios such as that described above are becoming more and more common. In addition, many application programs are built specifically to be executed on multiple different computer systems, and further to request execution of various modules on still other computer systems. Thus, it is increasingly the case that computer systems often now comprise multiple different application programs that use processing and resources from a number of other networked computer systems. Similarly, it is increasingly common for entities to set up one or more server systems whose primary purpose is to process application requests by other application programs on other computer systems.

Of course, one will appreciate that the increase in network processing can result in other difficulties. For example, it is often the case that even a single server may be insufficient to handle all the requests for processing a particular application (or application module) from other computer systems. Thus, many organizations may set up a "server farm" to handle requests by one or more application programs on other computer systems. In general, a server farm comprises a plurality of different servers that balance the processing load for various applications. For example, an organization may set up a farm of a plurality of different servers to handle email and internet processing requests in an organization with hundreds of different employees. In addition, organizations will typically configure server farms so that each server is "load balanced," meaning that each server handles a roughly equal number of incoming processing requests.

There are a number of ways to distribute requests, or balance loads, in a server farm environment, and such mechanisms generally involve some form of centralized, automated load balancing component. For example, the organization in the above example may set up another server dedicated only to load balancing issues for the email/internet server farm. The load balancing server might then receive all email and internet processing requests, and then send the requests to a particular server in the server farm based on a particular load balancing algorithm. The load balancing server will further use another "affinitization" algorithm/configuration to ensure that the load balancing component directs all incoming messages (e.g., from a particular client) associated with a particular processing request to the same server.

Conventional affinitization algorithms generally comprise one of two approaches to appropriately distributing messages in a server farm: use of an in-memory map, or use of a hashing algorithm. With an in-memory map, one or more load balancing components will use the map to keep track of where the component is sending messages with each particular processing request. The in-memory map, in turn, will typically include such information as an identifier for the originator of the request (e.g., client computer address), some identifier for the processing request that is associated with each message, and the name of a server that is executing the processing request. When the load balancing server receives a particular message from a client, therefore, the load balancing component(s) can then compare information in the received message with the in-memory map, and determine where to send the message.

In contrast, a hashing algorithm is a mathematical formula that considers much of the same information (e.g., message and client identifications), but uses this information to generate a value for each message. The load balancing component(s) at the load balancing server(s) can then use the generated value to direct the incoming message to a particular server. For example, the load balancing component might be configured to direct all incoming messages with a value if 1-10 to server A, and direct all other incoming messages with a value of 11-20 to server B, and so on. Notably, the value generated by the formula will always be the same number for all messages associated with a particular processing request, which ensures that messages associated with the same processing request always reach the same server.

Of course, either of the above-mentioned affinitization algorithms can result in difficulties. For example, maintaining in-memory data structures can be computationally expensive. In addition, when the load balancing server fails, the load balancing server may be unable to appropriately direct incoming messages when coming back online since the in-memory map will often be depleted. Even in the case where multiple load balancing servers are using a common in-memory data structure (that is not depleted), there may be race conditions that occur that cause the surviving server to use stale in-memory map information. At the time of failure of one load balancing server, for example, the surviving server may start to handle messages for a particular request before obtaining full access to the portion of the in-memory data structure previously used by the failing server. Even a delay of 1-2 seconds in this regard can result in the surviving load balancing server sending a message in a processing request to the wrong processing server in the server farm.

By contrast, hashing algorithms suffer difficulties when servers in a server farm begin to fail. For example, since conventional hashing algorithms typically primarily or only consider incoming message information (e.g., message and client identifiers, etc.), conventional load balancers may continue to send messages (in the same processing request from the same client) even to a failed server in the server farm. In such a case, the load balancing server may only be able to return an error to the requesting client until the appropriate server comes back online. Furthermore, the load balancing server may need to tell the requesting client to restart the particular processing request, since one or more of the previously sent messages may have been lost, or otherwise were not processed.

Of course, even if an administrator could implement one or more temporary solutions to accommodate a failed server, such solutions are often implemented after the failure. Furthermore, such solutions are unable to resurrect lost messages. Accordingly, there are a number of difficulties with conventional load balancing systems and mechanisms in server farms that can be addressed.

BRIEF SUMMARY

Implementations of the present invention overcome one or more problems in the art with systems, methods, and computer program products configured to efficiently direct or assign messages associated with a processing request to an appropriate server in a server farm. In at least one implementation, for example, a load balancing server (e.g., load balancing component in the server) uses one or more hashing functions to direct messages associated with a particular processing request to a server in a server farm. When the server farm composition or status changes (e.g., a server goes down, is performing at lower levels, or is added to the farm), the load balancing server uses a map-based function (in lieu of or in addition to the hashing function) to direct messages to working servers. Once identifying depletion of the map, the load balancing server can then direct/assign messages of a processing request to a server in the server farm using the hashing function.

For example, a method of automatically distributing messages in processing requests using a combination of server assignment functions can involve receiving from one or more clients a plurality of messages to be processed by one or more applications in a server farm. The server farm comprises a plurality of available servers. The method can also involve using a first of a plurality of server assignment functions to identify, for each message in a processing request, a server in the server farm that is available for processing each received initial message. In addition, the method can involve identifying that there has been a change in availability of servers in the server farm. Furthermore, the method can involve automatically using a second of a plurality of server assignment functions to identify, for each next message in a next processing request, a server in the server farm that is available for processing each received next message.

In addition to the foregoing, a method of automatically switching between alternate server assignment functions as needed to send client messages to an appropriate can involve using a hashing function to identify one or more servers in a server farm that can process one or more processing requests from a client. The hashing function uses a list of available servers and one or more message identifiers as input. The method can also involve identifying that a processing capacity for the server farm has changed. As such, the list of available servers needs to be updated. In addition, the method can involve automatically switching from the hashing function to an alternate server assignment function to assign new messages of a new processing request to an available server. In this case, an entry for each new processing request is placed in a server map. Furthermore, the method can involve, upon identifying that the list of available servers has been updated, switching from the alternate server assignment function to the hashing function using the updated list of available servers and one or more message identifiers as input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
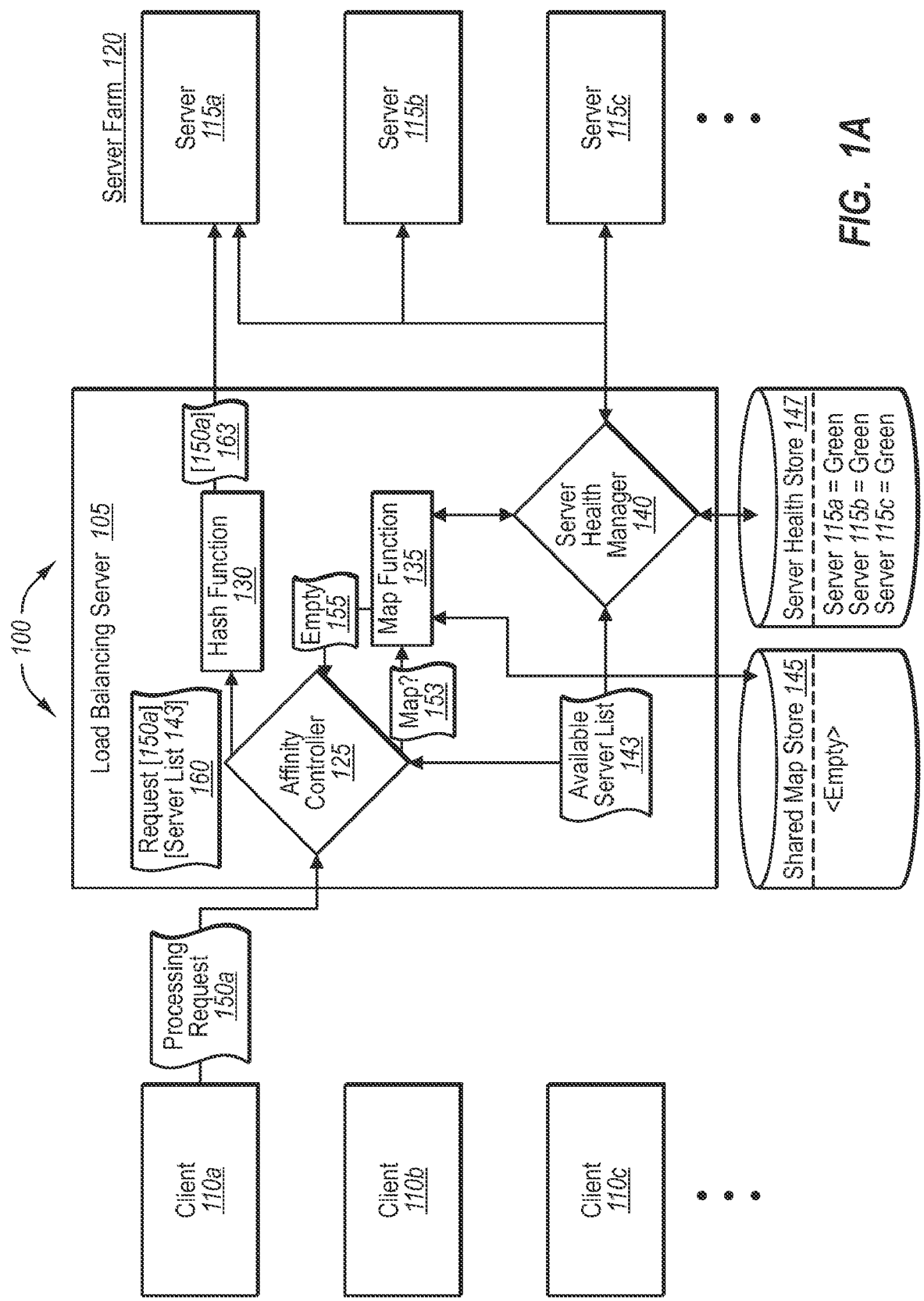
FIG. 1A illustrates an overview schematic diagram in accordance with an implementation of the present invention in which a load balancing server uses a first of two alternate server assignment functions to distribute messages of a processing request to a server in a server farm.

Implementations of the present invention extend to systems, methods, and computer program products configured to efficiently direct or assign messages associated with a processing request to an appropriate server in a server farm. In at least one implementation, for example, a load balancing server (e.g., load balancing component in the server) uses one or more hashing functions to direct messages associated with a particular processing request to a server in a server farm. When the server farm composition or status changes (e.g., a server goes down, is performing at lower levels, or is added to the farm), the load balancing server uses a map-based function (in lieu of or in addition to the hashing function) to direct messages to working servers. Once identifying depletion of the map, the load balancing server can then direct/assign messages of a processing request to a server in the server farm using the hashing function.

Accordingly, as will be understood more fully herein, implementations of the present invention can provide these and other ends with a number of different components. For example, implementations of the present invention can comprise a load balancing server (e.g., 105) having a service binding component (not shown). In general, the service binding component can include a communication stack that provides messages (from a client 110) to a load balancing server (e.g., an affinity controller 125 in the load balancing server 105). Implementations of the present invention can also include a correlation component (not shown), which can correlate messages based on the content of the message (e.g., part of the same processing request).

In one implementation, the correlation component can stamp one or more identifiers on any given message, and this stamp can be later used by an affinitization component (e.g., affinity controller 125). In general, the affinitization component reviews the headers in a given message, and determines (based on identifiers and a given server assignment function), where to dispatch the message in the server farm (e.g., 120). In addition, implementations of the present invention can comprise one or more binding components (not shown), which comprise a communication stack used between the load balancing server and a given server (e.g., 115a-c) in the server farm (e.g., 120).

Furthermore, implementations of the present invention can comprise a server health manager component (e.g., 140, also referred to as a "node manager"). In at least one implementation, the server health manager manages dynamic and static information about all the given servers (115) in the server farm 120 that will be assigned the various client messages. As understood more fully herein, the load balancing server (e.g., 105) can use information from the server health manager component to determine where to send new "activation messages," which are generally the first message in a processing request (or service instance). Otherwise, for the remaining messages in a processing request (i.e., "correlation messages"), the load balancing server will automatically send messages to an existing service instance at the same server (e.g., 115a-c) in the server farm 120.

As also understood herein, implementations of the present invention can further include one or more "active instance manager" components (not shown). In general, an active instance manager component comprises one or more components that maintain the latest information about service instances (e.g., client processing requests). In general, such processing requests are those that are currently active for the load balanced service when there is a need to depart from the otherwise default hashing functions. In such a case, the active instance manager thus maintains the location (e.g., relevant server in the server farm) of every service instance when a hashing function is not being used for some or all of the back end servers. As understood more fully herein, for example, an active instance manager component may interface between affinity controller 125 and shared map store 145 when one or more servers are operating in a "yellow" or "red" state to populate and report map entries into a corresponding message/server map. In at least one implementation, the active instance manager can be used to identify a given server (e.g., 115) where the load balancing server 105 should dispatch a particular message.

In addition, implementations of the present invention can include a configuration manager component. In at least one implementation, the configuration manager component provides one or more applications or components at the load balancing server (e.g., 105) with relevant configuration details. The configuration manager component can be configured to provide the static information of all of the back end nodes in a given server farm (e.g., 120). Furthermore, implementations of the present invention can include a container management service component (not shown). In at least one implementation, the container management service resides in a server (e.g., within server farm 120) container (e.g., for an application at the server), and provides information about the health of the given server (e.g., to health manager 140).

In one implementation, the container management service determines health by monitoring various environmental conditions like memory/CPU etc. Still further, implementations of the present invention can include an instance life cycle reporting service component (not shown), which resides in the server container, and provides events whenever the status of the service instances in the backend/server changes (e.g., when a service instance completes or dehydrates/passivates). The active instance manger component, in turn, can use either of these two events to clean up entries in the map store 145.

As understood more fully below, implementations of the present invention can thus use these aforementioned components, and other components, to effectively load balance activation messages. That is, and although not explicitly illustrated in each Figure, the components and modules described above and herein in accordance with implementations of the present invention allow the load balancing server(s) 105 to capably react to health changes in a server 115 within server farm 120. As understood more fully herein, such reactions can include efficiently and accurately routing messages to another server when an initial server in a server farm goes down, or cannot take new activation messages. In addition, implementations of the present invention accommodate failure or load balancing of processing requests that are handled through one or more load balancing components in one or more load balancing servers.

Specifically, implementations of the present invention provide a number of mechanisms, components, and modules, configured to effectively affinitize correlation messages in a processing request, even if the health of the backend container (recipient/assigned server 115) changes, or one or more components in the load balancing server 105 itself fail for any reason. These and other benefits can be realized since implementations of the present invention effectively combine two approaches to message/server assignment (i.e., hashing and mapping) to produce an approach which will have the positive characteristics of both solutions.

FIG. 1A illustrates an overview schematic diagram of a system 100 configured in accordance with an implementation of the present invention. As shown, system 100 comprises a plurality of clients 110, one or more load balancing servers 105, and one or more server farms 120. The one or more load balancing servers 105, serve as a front to the various processing requests, and distribute each client processing request (and its corresponding correlation messages) to server farm 120. The one or more server farms 120, in turn, each comprises a plurality of different servers 115(a-c, etc.), to which the one or more load balancing servers 105 direct/assign messages in a particular processing request.

For example, a client (e.g., any of clients 110a, 110b, or 110c) requests processing by one or more application programs installed in server farm 120. Each processing request, in turn, can comprise a series of one or more messages, including messages to initiate/activate the processing request (i.e., an "activation message"), one or more messages comprising data for the request (i.e., a "correlation message"), and one or more messages closing the processing request (i.e., another "correlation message"). While the load balancing server 105 will send any processing request to any arbitrary server 115 in server farm 120 capable of handling the request, the load balancing server 105 will typically send all correlation messages for any given processing request to the same server (e.g., 115a, 115b, or 115c, etc.) in the server farm 120.

To handle these server assignments, therefore, FIG. 1A further shows that load balancing server 105 can use a plurality of different components to make determinations about each message. For example, FIG. 1A shows that load balancing server 105 comprises an affinity controller 125, which communicates with server health manager 140. FIG. 1A also shows that affinity controller 125 uses a plurality of different "server assignment functions" to distribute and assign messages in the server farm 120. For example, FIG. 1A shows that the plurality of server assignment functions can comprise at least a hash function 130, and a map-based function 135. Affinity controller 125 then uses these functions to assign and distribute various messages received from the clients 110.

For example, FIG. 1A shows that client 110a sends one or more processing requests 150a to be processed by one or more servers in server farm 120. Load balancing server 105, in turn, handles distribution of the request (pursuant to load balancing) through affinity controller 125. Although the load balancing server 105 can default to use of the hash function 130, FIG. 1A shows that affinity controller can also or alternatively first check to see if a server map has been populated. For example, FIG. 1A shows that affinity controller 125 sends one or more messages 153 to identify whether a map in the shared map store 145 has been populated. In at least one implementation, this can ensure that the hash function 130 is not used inappropriately, such as using the hash function when the list of servers (used as an argument) is out of date.

In general, the "map," "server map," or "map store" 145 comprising the server map, will comprise information (e.g., one or more map entries) about where variously received processing requests 150 have been directed/assigned. For example, when a map-based function (e.g., 135) is in use (e.g., there is a problem or change in the server farm 120), load balancing server 105 will populate map store 145 with one or more map entries to indicate the particular server (115a-c) where request 150a was directed. As previously mentioned, however, the map-based function (e.g., 135) will typically be operating temporarily during a change in server farm 120 processing capability. For example, the health of one or more servers 115 in server farm 120 has declined, or an administrator has moved, removed, or added a new server 115 in the farm 120.

Accordingly, since FIG. 1A illustrates an initial case in which there are no changes in server farm 120, there are thus no map entries in shared map store 145. FIG. 1A shows, therefore, that affinity controller 125 identifies (e.g., 155) that map store 145 is empty, and can thus use the hash function 130 to handle processing request 150a. Specifically, FIG. 1A shows that affinity controller 125 sends request 160 through hash function 130.

In general, a hash function (e.g., 130) comprises a formula that generates a value (e.g., used to identify a location endpoint) corresponding to the parameters of a given input. Thus, for example, a generalized hash function in accordance with an implementation of the present invention comprises: Hash (Affinity ID, List of Locations)=Location ID. In this formula, the assigned server address determined from the hash function (i.e., "Location ID") is entirely dependent on the "Affinity ID," and "List of Locations" used in the hash function. As understood herein, and as previously mentioned, an affinity ID comprises an identifier that is common among all messages in a processing request, and is typically different from one processing request to the next. The list of locations, in turn, comprises a list of servers 115 that are available for use in a given server farm 120. Thus, FIG. 1A shows that the affinity controller 125 obtains the list of locations, or "available server list" 143, from server health manager 140, and supplies this as input to the hash function 130.

As a preliminary matter, and by way of explanation, the extent to which server health manager 140 determines that a given server is "available" can turn on a number of different factors. In at least one implementation, for example, server health manager 140 determines that a server 115 is "available" when the server 115 is responding at all to load balancing server 105 (e.g., acknowledging messages received in a sent processing request). In additional or alternative implementations, however, server health manager 140 determines that a given server 115 is "available" based on additional levels of granularity intended to project not only current health, but future health of a given server 115.

For example, FIG. 1A shows that server list 143 maintains a list of all servers 115a in server farm 120, including an indication of one or more health indicators in server health store 147. Server health manager 140, in turn, can determine these various indicators any number of ways. For example, servers 115a, 115b and 115c, etc. can send one or more periodic messages to server health manager 140. Alternatively, server health manager 140 can send one or more messages to the servers 115a, 115b and 115c. Similarly, load balancing server 105 can be configured to monitor the progress of client request messages that have been sent out to the various servers. If a particular server fails to respond to (or confirm receipt of) one or more the messages over some time interval, server health manager 140 can then make various assumptions about the health of the particular server 115.

In at least one implementation, for example, server health manager 140 assumes that, when a server acknowledges receipt of a particular message within a particular time interval, that particular server is operating appropriately in a "green" state (or a first state). Similarly, when the server 115 sends back acknowledgements in a subsequent or delayed time interval, server health manager 140 may then assume that the given server 115 is operating in a "yellow" state (or a second state). By contrast, if the server health manager 140 fails to receive any acknowledgement messages during any particular time interval, or otherwise receives some message that a given server will be going offline, the server health manager 140 can determine that this particular server is operating in a "red" state (or third state). Of course, one will appreciate that these various state indicators can be alternately binary (e.g., "green"/"red," "first"/"second"), or could have many more additional indicators than those listed, each with a different set of implications for load balancing server 105.

In any event, and in view of the above "green," "yellow," and "red" state descriptions, FIG. 1A shows that server health store 147 comprises information indicating that servers 115a, 115b, and 115c are all operating properly, and thus each comprise a status of "green." Thus, in this particular case, the available server list 143 communicated between server health manager 140 and affinity controller 125 will include each of servers 115a, 115b, and 115c. Furthermore, when affinity controller 125 sends request 150a (e.g., the first message of this request) through hash function 130, affinity controller 125 further provides a message 160 comprising an affinity ID (e.g., "[150a]"), as will as the server list 143 as part of the arguments. As shown in FIG. 1A, hash function 130 then processes the received message(s) of processing request 150a and calculates an endpoint (in this case server 115a). For example, FIG. 1A shows that load balancing server sends one or more messages 163 to server 115a comprising one or more of the messages in processing request 150a.

By way of explanation, one will appreciate that, when employing hash function 130, load balancing server 105 (or a load balancing component, such as affinity controller 125) can fail at any time, and client 110 messages will still arrive at their appropriate server 115 destinations. This is because the failover affinity controller (not shown) in load balancing server 105, or another load balancing server (not shown), will also be using a hashing function. Since each failover load balancing server/component uses the same hashing formula, and obtains the same inputs, the identified location ID will be the same for each subsequent message corresponding to or correlating with the same processing request from a client.

For example, though not shown in FIG. 1A, if affinity controller 125 failed after handling processing request 150a, a failover load balancing component (e.g. in load balancing server 105, or in another server) can handle the next message (e.g., $150a_1$, FIG. 1B) in this processing request. Since the failover load balancing component would also use the same affinity ID (e.g., identifier stamped in the next message) and the same list 143 of available servers, the failover load balancing component would necessarily calculate the same endpoint for the next message in the request (i.e., server 115a). Thus, in at least one implementation, use of the hashing function ensures that all load balancing servers and/or load balancing components in system 100 will direct messages associated with the same processing request to the same server 115 in server farm 120, virtually regardless of failure in the load balancing server(s) 105.

Figure 1B:
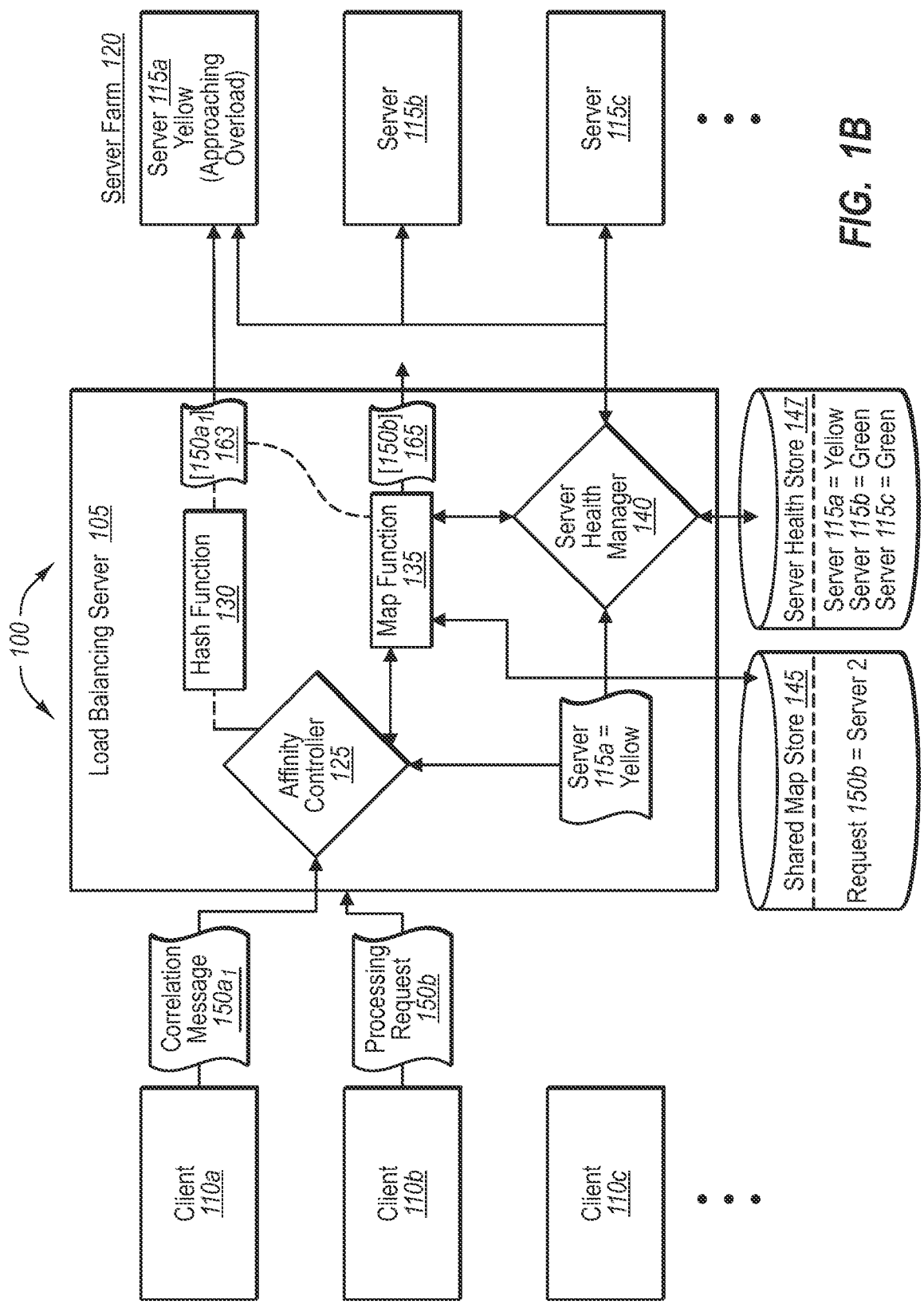
FIG. 1B illustrates the schematic diagram of FIG. 1A in which the load balancing server switches to a second server assignment function for distributing messages.
Figure 1C:
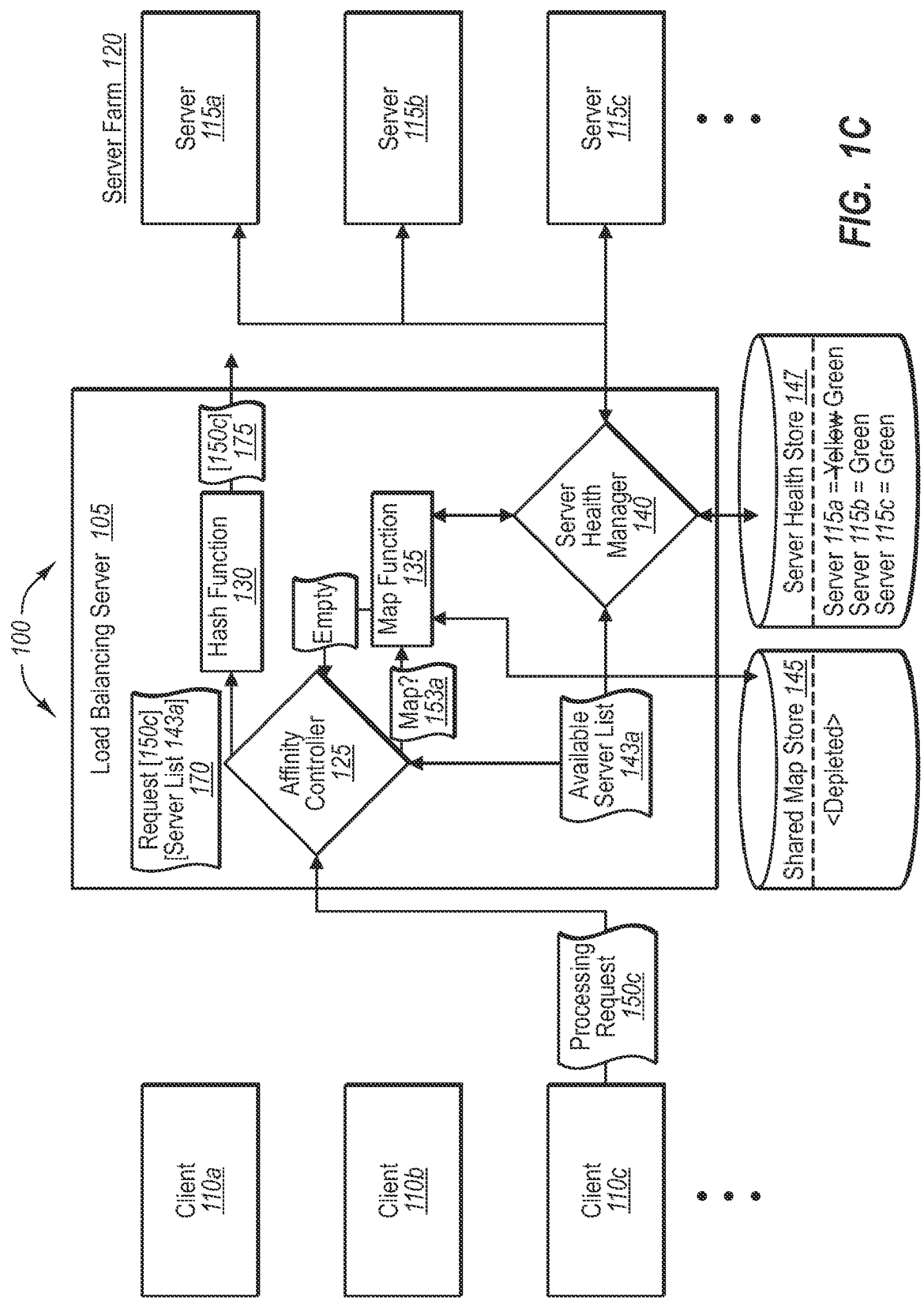
FIG. 1C illustrates the schematic diagram of FIG. 1A in which the load balancing server has depleted a map store, and switches back to the first server assignment function to distribute messages.

FIG. 1B illustrates how a load balancing server (e.g., 105) can respond in the event of failure of servers 115 in server farm 120. Specifically, FIGS 1B and 1C illustrate how the one or more load balancing servers can alternate between server assignment functions when determining a change in the server farm 120. For example, FIG. 1B shows that server health manager 140 has determined that server 115a is approaching an overload state and thus, determines that server 115a is "yellow." FIG. 1B also shows that server health manager 140 communicates the same to affinity controller 125. In at least one implementation, this change in state to "yellow" of any server 115 in server farm 120 indicates to affinity controller 125 that the server address list 143 is out of date, and will soon be updated.

In at least one implementation, this indication of change causes affinity controller to dynamically use the map-based function 135, or a combination of the map-based function 135 and hash function 130, as appropriate. This can allow load balancing server 105 to send new activation messages (i.e., new processing requests 150) only to those servers whose state is "green", and otherwise send correlation messages for a particular processing request to the appropriate server (i.e., the initial server where the activation message was first sent) whose state is "green" or "yellow." As a result, the burden on a server whose status is "yellow" will gradually lessen as it processes what has already been assigned (i.e., correlation messages of existing instances), but no new sets of processing requests (i.e., new instances).

FIG. 1B illustrates additional details on how this can be done. For example, FIG. 1B shows that server health manager 140 sends one or more messages to affinity controller 125 indicating that server 115a has entered a "yellow" state. In at least one implementation, this can cause affinity controller 125 to immediately switch to a new server assignment mode, such as a map-based mode, or a combination mode, so that only correlation messages $150a_1$ can continue through the hash function, or alternatively, that correlation messages $150a_1$ can be mapped and sent to a server.

For example, when affinity controller 125 receives correlation message $150a_1$, affinity controller 125 can first check to see if there is a record in shared map store 145, much like as previously shown with message 153. In this case, FIG. 1B shows that there is currently no record for processing request 150a in store 145 since all of the prior messages for this request, including the activation message were sent using a hash function. Thus, affinity controller 125 can use hash function 130, along with the same arguments (i.e., message ID, available server list, etc.) used for activation message 150a in order to process correlation message $150a_1$. Accordingly, FIG. 1B shows that affinity controller 125 uses hash function 130 to send correlation message $150a_1$ to server 115a, which is currently in a "yellow" state.

When the only change is that a server has gone from a "green" to a "yellow" state, and vice versa, the above-scenario will continue to work seamlessly, at least in part since there is no significant change away from using the hashing function 130. Notably, however, if server 115a changed from the "yellow" state to a "red" state, and is offline, or otherwise became incapable of receiving any messages at all, load balancing server 105 might determine from some other means (e.g., no acknowledgment, lost connection, etc.) that processing request $150a_1$ needs to be distributed elsewhere in server farm 120. One way this might occur is that affinity controller 125 uses hash function 130 to send message $150a_1$ to server 115a, but receives no acknowledgement/confirmation from server 115a. In a similar situation, such as during a changeover from a hashing function 130 to a map function 135, and back to a hashing function 130, there may be other instances in which the load balancing server 105 sends a message to the wrong location.

In any of the above cases, the load balancing server 105 can handle message rerouting and error handling any number of ways. In one implementation, for example, the servers 115 (e.g., those able to respond) in server farm 120 could be configured to provide a "rich exception" (i.e., an error message) that contains information about the correct destination/failover server 115 for the given message. The load balancing server 105 could then review the rich exception message and resend the message to the new/correct destination server 115 in server farm 120.

In other cases, the load balancing server 105 could alternatively reroute messages based on a "not so rich exception" (i.e., an error message with no information about a new destination). In such a case, the load balancing server 105 could be configured to resend the message to every server 115 (e.g., qualifying as a green or yellow state) in server farm 120 until eventually finding the correct server, or correct failover server. A similar action could be taken when sending a message to a "red" server which is incapable of sending back an acknowledgement. In either case, and whether a server 115a is in a "yellow" or "red" state, affinity controller 125 can update the map store 145 when identifying the appropriate server, whenever it sends a message that has not been associated with the map, so that additional correlation messages can be appropriately handled through map function 135.

In still other cases, the load balancing server 105 could send the exception (i.e., "rich exception" or "not so rich exception," or indication of no acknowledgement) back to the client 110a, and let the client determine what to do. In one implementation, for example, the client 110 might be configured to simply restart the processing request 150, which could mean that the load balancing server 105 uses the hashing function 130 using an updated server list (e.g., 143a) for a new instance of the prior request. Thus, determining where to send new client processing requests (e.g., 150b) is not as complicated.

Along these lines, FIG. 1B shows that affinity controller 125 receives a new processing request 150b from client 110b. Since this new request involves a new activation, affinity controller 125 uses map function 135 to identify an appropriate server for creating an instance for the new processing request. In at least one implementation, affinity controller 125 uses a round-robin approach (e.g., last recently used, or LRU) to distribute the messages to the remaining available servers (i.e., those in a "green" state, servers 115b, 115c). In such a case, the servers listed in the round-robin mechanism include only those servers that qualify as being in a "green" state.

For example, FIG. 1B shows that affinity controller 125 uses map function 135, which determines to send activation message 150b via message 165 to server 115b (operating as "green"). For additional messages corresponding to processing request 150b (or any other processing request), load balancing server 105 will continue to use the map function 135 where there is an entry in map store 145. For received correlation messages that are not associated with an entry in map store 145, affinity controller 125 can use the hash function 130 based on the prior server list 143, as previously described.

Eventually, however, load balancing server 105 will optimally switch back to hash function 130 when the map function 135 is no longer needed. In general, the map function 135 will no longer be needed once affinity controller 125 has received an updated server list, or has otherwise received an indication that the server(s) previously identified as "yellow" have switched back to a "green" status. As understood more fully below, affinity controller 125 will continue to use the map function 135, or the map function 135 in combination with the hash function 130, until a number of events are satisfied.

For example, FIG. 1C illustrates that at least one of these events includes the affinity controller 125 receiving or identifying one or more updated lists of available servers 143a. Upon receiving the updated list 143a, affinity controller 125 will not necessarily immediately switch from map function 135 to hash function 130. Rather, in at least one implementation, affinity controller 125 ceases to handle new processing requests through map function 135, and waits until the shared map store 145 has been depleted. Specifically, for each new activation message (e.g., processing request 150c), affinity controller 125 can use hash function 130, providing as arguments the message ID and the updated server list 143a. For each correlation message (e.g., 150$a_1$, FIG. 1B), affinity controller 125 continues to use the map function 135/map store 145 to direct the given correlation message to the appropriate server 115 in server farm 120. Once any particular processing request is completed, however, load balancing server 105 (i.e., one or more components therein) will delete the corresponding map entries in map store 145.

Once the map store 145 is depleted, load balancing server 105 reverts back to the hash function 130 exclusively, following essentially the same process as described with FIG. 1A, albeit with an updated server list 143a. For example, FIG. 1C shows that, when affinity controller 125 receives a client request (e.g., 150c), affinity controller 125 first attempts to identify (e.g., message 153a) whether the server map (e.g., via map store 145) is populated. If there is no entry for the received message, affinity controller 125 uses the hash function 130 with the updated server list 143a, as previously described. In this particular case, since each of the servers 115(a-c) in server farm 120 have reverted back to a "green" state per health store 147, and as reflected in the updated server list 143a, any of servers 115(a-c) will be considered in the hash function. For example, FIG. 1C shows that load balancing server 105 sends request 150c via message 175 to server 115a.

Accordingly, the above examples illustrate a situation in which one server switches from a capable state to a less capable state and back to a capable state. One will appreciate that implementations of the present invention are equally applicable to the situation in which a server 115 goes off-line, or otherwise when removing or adding a server 115 to the server farm 120. For example, in either of these two alternate scenarios, the affinity controller 125 switches to a map-based function 135, or a combination of mapping and hashing, any time identifying that there has been a change in the server farm 120. As before, once identifying that the server list has been updated, the affinity controller 125 can then use the hash function 130 exclusively after identifying that the map store 145 has been depleted.

At least one reason for using the map function 135 temporarily before using the hashing function 130 is that it is sometimes easier to identify the mere fact of a server change than it is to receive a correct, current list of available servers. Specifically, the determinations that need to be made in certifying the health or accessibility of a given server, including the relevant endpoints used by each server 115 in server farm 120 may occur in some cases more slowly than the time between which affinity controller 125 receives each message from a client 110. Although the difference may be a matter of seconds in some cases, there may be times when the delay for populating a new server list 143a could be minutes, hours, or longer. Accordingly, the ability to switch back and forth between the hashing function 130 and a map-based function 135, or combinations thereof, and the message routing correction functions described herein, provides a great deal of flexibility, accuracy, and efficiency in routing messages with load balancing servers 105.

Figures 2, 3:
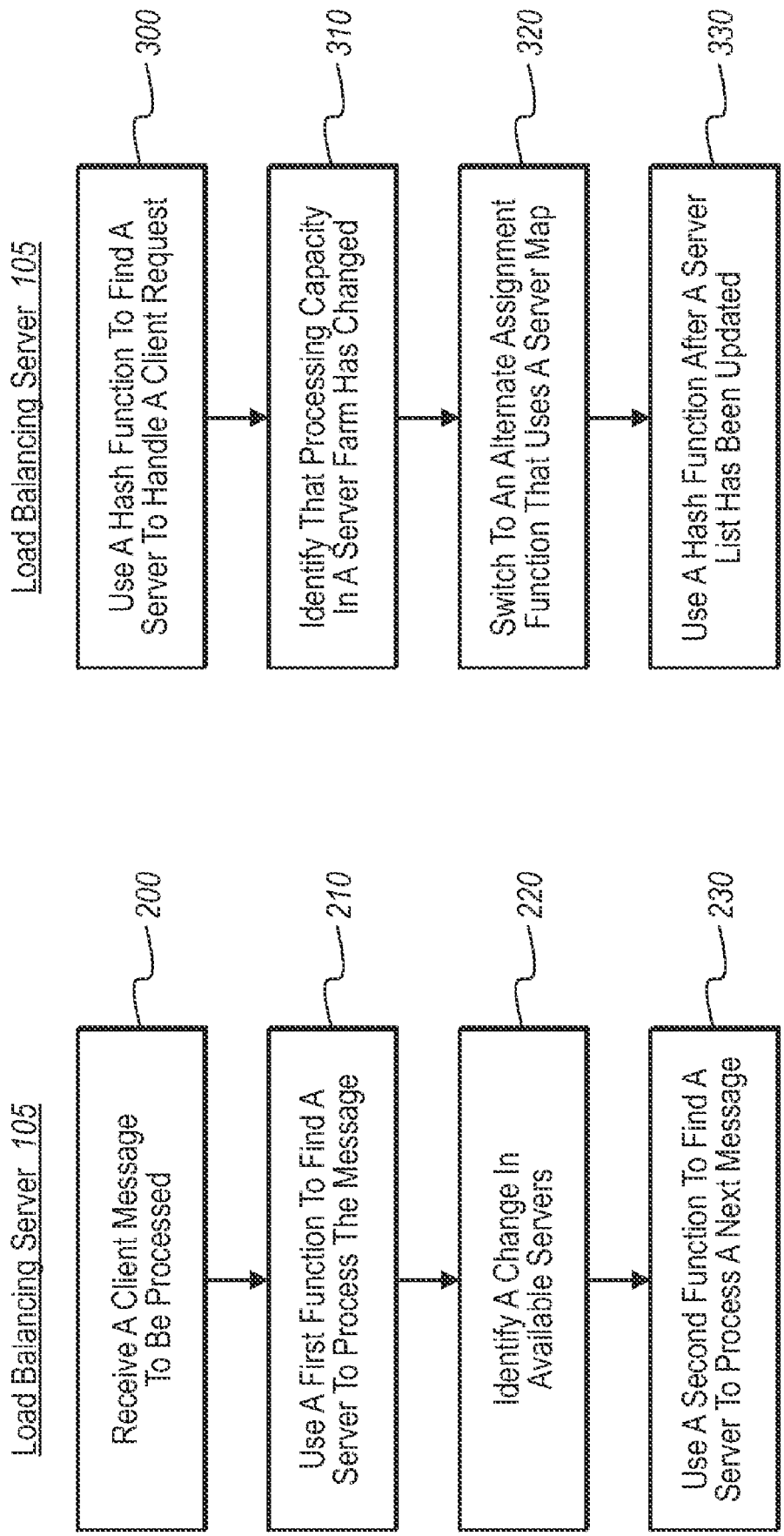
FIG. 2 illustrates a flow chart of a series of acts in a method for processing one or more client processing requests using first and second server assignment functions.
FIG. 3 illustrates an additional or alternative flow chart from the perspective of the load balancing server comprising a series of acts for switching from a hashing function to a map-based function back to a mapping function based on server health in a server farm.

In addition to the foregoing, implementations of the present invention can also be described in terms of one or more acts in a method for accomplishing a particular result. For example, FIG. 2 illustrates a flowchart of a method for processing one or more client messages within the server farm, using a plurality of different routing/delivery functions. In addition, FIG. 3 illustrates a flowchart of a method for switching to and from a hashing function and map function to distribute messages in a server farm. The acts in FIGS. 2 and 3 are described more fully below with respect to the components and diagrams of FIGS. 1A through 1C.

For example, FIG. 2 shows that the method from the perspective of load balancing server 105 can comprise an act 200 of receiving a client message to be processed. Act 200 includes receiving from one or more clients a plurality of messages to be processed by one or more applications on a server farm, wherein the server farm comprises a plurality of available servers. For example, FIG. 1A shows that client 110a sends one or more processing requests 150a to load balancing server 105. Processing request 150a involves one or more requests that can be executed by one or more applications in one or more of the servers 115a, 115b or 115c in server farm 120.

FIG. 2 also shows that the method can comprise an act 210 of using a first function to find a server to process the message. Act 210 can include a first of a plurality of server assignment functions to identify, for each message in a processing request, a server in a server farm that is available for processing each received initial message. For example, FIG. 1A shows that affinity controller 125 identifies that the shared map store 145 is empty, and thus uses hash function 130 to assign and distribute processing request 150*a* to server 115*a* in server farm 120.

In addition, FIG. 2 shows that the method can comprise an act 220 of identifying a change in available servers. Act 220 includes identifying that there has been a change in availability of servers in the server farm. For example, FIG. 1B shows that affinity controller 125 can receive one or more indications (e.g., from server health manager 140) that a particular server is operating as "yellow" or "red." Through similar means, affinity controller 125 can also identify if a server has been added to, or taken away from, server farm 120.

Furthermore, FIG. 2 shows that the method can comprise an act 230 of using a second function to find a server to process a next message. Act 230 includes automatically using a second server assignment function to identify, for each next message in a next processing request, a server in the server farm that is available for processing each received next message. As shown in FIG. 1B for example, affinity controller 125 can start using map function 135 upon identifying that there is a change in the server list. In this case, map function 135 sends new processing requests and correlation messages to various servers 115 in the server farm 120 (i.e., other than those that have a "yellow" or "red" status). Map function 135 continues to update the map based on where the various processing requests have been assigned.

In addition to the foregoing, FIG. 3 illustrates that an additional or alternative method from the perspective of load balancing server 105 can comprise an act 300 of using a hash function to find a server to handle a client request. Act 300 includes using a hash function to identify one or more servers in a server farm that can process one or more processing requests from a client, wherein the hashing function uses a list of available servers and one or more message identifiers as input. For example, FIG. 1A shows that load balancing server 105 receives processing request 150*a* and handles this processing request through hash function 130. This results in assignment and delivery of processing request 150*a* to server 115*a*.

FIG. 3 also shows that the method can comprise an act 310 of identifying that the processing capacity in a server farm has changed. Act 310 includes identifying that a processing capacity for the server farm has changed, wherein the list of available servers needs to be updated. For example, FIG. 1B shows that affinity controller 125 receives one or more indications from server health manager 140 that server 115*a* has changed to a "yellow" or "red" status. As a result in at least one implementation, this means that server 115*a* is no longer available for receiving certain types of messages that would increase the current burden of the server 115*a*, such as new activation messages.

In addition, FIG. 3 shows that the method can comprise an act 320 of switching to an alternate assignment function that uses a server map. Act 320 includes automatically switching from the hashing function to an alternate server assignment function to assign new messages of a new processing processing request to an available server, wherein an entry for each new processing request is placed in a server map. For example, FIG. 1B shows that affinity controller 125 receives one or more requests 150*a*$_1$ and 150*b*, and that affinity controller 125 can uses map function 135 to distribute one or both of these messages to an appropriate, capable server 115 in the server farm 120. Affinity controller 125 can then use the map function 135, or the map function 135 in combination with the hash function 130, to not only send messages to available servers, such as those that qualify as being "green," but also create map entries for new activations (i.e., new processing requests).

Furthermore, FIG. 3 shows that the method can comprise an act 330 of using a hash function after a server list has been updated. Act 330 includes, upon identifying that the list of available servers has been updated, switching from the alternate server assignment to the hashing function using the updated list of available servers and one or more message identifiers as input. For example, as shown in FIG. 1C, once the shared map store 145 has become depleted, the affinity controller 125 can move away from the map function 135, and start using the hash function 130 again in exclusive fashion. For example, FIG. 1C shows that, after map store 145 is depleted, affinity controller 125 sends one or more messages 170 to hash function 130 which includes the message 150*c* and the arguments of the updated server list 143*a*. FIG. 1C then shows that this results in assignment and delivery of request 150*c* via one or more messages 175 to server 115*b*.

Accordingly, FIG. 1A-3 and the corresponding text provide a number of components and mechanisms that can be used to ensure that processing requests are effectively and efficiently load-balanced in a server farm despite a number of potential failures. For example, implementations of the present invention efficiently account for load balancer failure by using hashing algorithms, which avoid the resource consumption and race conditions that can occur when using map-based resources. In addition, implementations of the present invention can efficiently account for server farm changes and failure (both temporary and permanent) by adaptively using map-based functions, or combinations of map-based functions and hashing algorithms. Furthermore, implementations of the present invention can efficiently account message routing errors, such as making determines (or allowing the client to make determinations) about rich and non-rich exception messages. This allows the load balancing server to continually and accurately distribute messages to a server farm undergoing change until the server farm becomes relatively constant again (e.g., a server's function is restored, or is permanently added/removed).

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a load balancing server in a computerized environment comprising one or more load balancing components, a plurality of servers in a server farm, and one or more clients that request processing in the server farm, a method of automatically distributing messages in processing requests using a combination of server assignment functions, each request comprising a plurality of messages, the method comprising the acts of:
    receiving from a client a first message to be processed by one or more applications in a server farm, wherein the server farm comprises a plurality of servers;
    routing the first message using a first routing mode by using a hashing function to identify a first server in the server farm to process the first message, the hashing function employing a first list of the plurality of servers in the server farm;
    receiving an indication that the number of available servers in the server farm has changed;
    switching to a second routing mode that employs the hashing function and a mapping function simultaneously for routing subsequently received messages such that, for each subsequently received message, the following are performed:
        determining whether an entry exists in a map that corresponds with the subsequently received message such that:
            if an entry exists, the subsequently received message is routed to the server identified by the entry, whereas,
            if an entry does not exist, and the subsequently received message is not the first message in a request, using the hashing function, with the first list, to identify a server to send the subsequently received message to; and
            if an entry does not exist, and the subsequently received message is the first message in a request, using the hashing function, with an updated list of available servers, to identify a server to send the subsequently received message to, and adding an entry to the map to identify the server to which the subsequently received message was sent;
    determining that the map contains no entries; and
    switching back to the first routing mode.

2. The method as recited in claim 1, wherein the indication comprises the updated list.

3. The method as recited in claim 2, wherein the hashing function takes as input at least a message identifier for each message in a processing request, and a list of servers.

4. The method as recited in claim 1, wherein the change in the number of available server comprises one or more of:
    a change by one or more servers in the server farm from an available state to an overloaded state;
    the presence of one or more new servers that have been added to the server farm; or
    the removal of one or more servers from the server farm.

5. The method as recited in claim 1, further comprising:
    removing an entry from the map when a request corresponding to the entry has been completed.

6. The method as recited in claim 1, wherein:
    receiving an indication comprises identifying that one of the servers in the server farm is unavailable; and
    creating the updated list of available servers by removing the server from the first list.

7. The method as recited in claim 6, wherein identifying that one of the servers in the server farm is unavailable further comprises receiving one or more acknowledgement messages from the unavailable server over a longer than expected interval.

8. At a load balancing server in a computerized environment comprising one or more load balancing components, a plurality of servers in a server farm, and one or more clients that request processing in the server farm, a computer program storage product comprising computer-executable instructions stored thereon that, when executed, cause one or more processors in the load balancing server to perform a method of automatically distributing messages in processing requests using a combination of server assignment functions, each request comprising a plurality of messages, the method comprising:
    receiving from a client a first message to be processed by one or more applications in a server farm, wherein the server farm comprises a plurality of servers;
    routing the first message using a first routing mode by using a hashing function to identify a first server in the server farm to process the first message, the hashing function employing a first list of the plurality of servers in the server farm;
    receiving an indication that the number of available servers in the server farm has changed;
    switching to a second routing mode that employs the hashing function and a mapping function simultaneously for routing subsequently received messages such that, for each subsequently received message, the following are performed:
        determining whether an entry exists in a map that corresponds with the subsequently received message such that:
            if an entry exists, the subsequently received message is routed to the server identified by the entry, whereas,
            if an entry does not exist, and the subsequently received message is not the first message in a request, using the hashing function, with the first list, to identify a server to send the subsequently received message to; and
            if an entry does not exist, and the subsequently received message is the first message in a request, using the hashing function, with an updated list of available servers, to identify a server to send the subsequently received message to, and adding an entry to the map to identify the server to which the subsequently received message was sent;
    determining that the map contains no entries; and
    switching back to the first routing mode.

* * * * *